US008654897B2

(12) United States Patent
Hu et al.

(10) Patent No.: US 8,654,897 B2
(45) Date of Patent: Feb. 18, 2014

(54) RECEIVING CIRCUIT, TRANSMITTING CIRCUIT, MICRO-CONTROLLER AND METHOD FOR POWER LINE CARRIER COMMUNICATION

(75) Inventors: Yajun Hu, Qingdao (CN); Song Pan, Shanghai (CN); Jian Cui, Qingdao (CN); Guangsheng Chen, Shanghai (CN); Rui Wang, Qingdao (CN)

(73) Assignees: Qingdao Eastsoft Communication Technology Co., Ltd., Qingdao (CN); Shanghai Haier Integrated Circuit Co., Ltd., Shanghai (CN)

( * ) Notice: Subject to any disclaimer, the term of this patent is extended or adjusted under 35 U.S.C. 154(b) by 0 days.

(21) Appl. No.: 13/609,240

(22) Filed: Sep. 10, 2012

(65) Prior Publication Data

US 2013/0003792 A1    Jan. 3, 2013

Related U.S. Application Data

(63) Continuation of application No. PCT/CN2010/073493, filed on Jun. 3, 2010.

(30) Foreign Application Priority Data

Mar. 10, 2010   (CN) .......................... 2010 1 0123198

(51) Int. Cl.
 *H03D 3/00* (2006.01)
 *H03K 9/06* (2006.01)
(52) U.S. Cl.
 USPC ........... 375/322; 375/324; 375/329; 375/334; 329/300; 329/304
(58) Field of Classification Search
 USPC ........... 375/322–324, 329–337; 329/300–310
 See application file for complete search history.

(56) References Cited

U.S. PATENT DOCUMENTS

2002/0067755 A1  6/2002  Perkins .......................... 375/130
2004/0122531 A1*  6/2004  Atsuta et al. ...................... 700/1

FOREIGN PATENT DOCUMENTS

CN   1381127 A    11/2002
CN   101267418 A   9/2008
WO   WO99/23762 A1  5/1999

(Continued)

OTHER PUBLICATIONS

International Search Report of International Application No. PCT/CN2010/073493, dated Dec. 16, 2010.

(Continued)

*Primary Examiner* — Curtis Odom
(74) *Attorney, Agent, or Firm* — J.C. Patents

(57) ABSTRACT

A receiving circuit, a transmitting circuit, a micro-controller, and a method for power line carrier communication. The receiving circuit includes: an analog amplifier, a receiving filter, an analog-to-digital converter, a digital mixer, a digital filter, and a digital demodulator connected successively. The transmitting circuit includes: a digital modulator, a gain controller, a digital-to-analog converter, a transmitting filter, and a transmitting amplifier connected successively. The microcontroller includes a central processor and the receiving circuit or the transmitting circuit. The method for power line carrier communication can be implemented based on the receiving circuit or the micro-controller. The receiving circuit, the transmitting circuit, the micro-controller, and the method for power line carrier communication provided by present invention solve the defect of supporting only one modulation or demodulation mode in a conventional power line carrier communication system, and can process a power line carrier signal in different modulation or demodulation modes.

10 Claims, 8 Drawing Sheets

(56) References Cited

FOREIGN PATENT DOCUMENTS

| | | |
|---|---|---|
| WO | WO03/098813 A2 | 11/2003 |
| WO | WO2006/123808 A1 | 11/2006 |
| WO | WO2008/005507 A2 | 1/2008 |
| WO | WO2009/006685 A1 | 1/2009 |

OTHER PUBLICATIONS

The extended European search report of corresponding European application No. 10 84 7221, dated Oct. 4, 2013.
Chinese Second Examination Report of corresponding Chinese Application No. 201010123198.4, dated Oct. 18, 2013.

* cited by examiner

RECEIVING CIRCUIT, TRANSMITTING CIRCUIT, MICRO-CONTROLLER AND METHOD FOR POWER LINE CARRIER COMMUNICATION

CROSS-REFERENCE TO RELATED APPLICATIONS

This application is a continuation of International Application No. PCT/CN2010/073493, filed on Jun. 3, 2010, which claims the priority benefit of China Patent Application No. 201010123198.4, filed on Mar. 10, 2010. The contents of the above identified applications are incorporated herein by reference in their entirety.

FIELD OF THE TECHNOLOGY

The present invention relates to power line carrier communication technologies, and particularly, to a receiving circuit, a transmitting circuit, a micro-controller, and a method for power line carrier communication.

BACKGROUND TECHNOLOGY

One of the main problems in power line carrier communication is how to modulate, demodulate, and process a communication signal in a very complex power noise environment. At present, many chips applied to power line communication are successively released, for example, PL31 series products available from Echelon Company in USA, and ST7538 chips available from ST Microelectronics Company in Switzerland, and these chips have made great contribution to the development of power line carrier communication.

FIG. 1 is a schematic structural diagram of a conventional power line carrier communication system. As shown in FIG. 1, in the system, a carrier signal of a power line coupling circuit 15 is amplified by a receiving front-end circuit in an analog front-end circuit 14, then the carrier signal is directly fed into a power line transceiver 13 to perform an analog-to-digital conversion under the control of a central controller 12 and demodulation through a digital signal processor (hereinafter referred to as "DSP"). With regard to a digital signal of an application system 11, under the control of the central controller 12, the power line transceiver 13 modulates the digital signal and a digital-to-analog circuit converts the digital signal into an analog carrier signal, then the analog carrier signal is directly amplified through a transmitting amplifier in the analog front-end circuit 14 and sent out through the power line coupling circuit 15. The system structure as shown in FIG. 1 is simple, and the effect is not desirable, e.g., it can only apply to a power noise environment with low interference, can only use a single modulation mode, and uses the general purpose DSP, which has relatively high manufacturing cost.

FIG. 2 is a schematic structural diagram of another conventional power line carrier communication system. As shown in FIG. 2, an analog front-end circuit 21 bandpass filters a carrier signal, the carrier signal is transmitted to a frequency-shift keying (hereinafter referred to as "FSK") demodulator 23 via an intermediate frequency filter 22 to perform demodulation, and then the demodulated data are provided to a micro-controller to perform a processing via a serial communication interface 24. A digital signal is provided to an FSK modulator 25 via the serial communication interface 24 to perform modulation, filtered by a transmitting filter 26, then the modulated carrier signal is filtered and amplified through the analog front-end circuit 21, and sent out. The frequency of the FSK modulator or FSK demodulator and the parameter of each of the filters are controlled by a control register 27. This technical solution is to perform an external processing with transmitting data to a micro-controller via the serial communication interface. It increases the complexity and manufacturing cost of related products, and this technical solution may be only used in the FSK modulation mode. In addition, the solution of performing modulation and demodulation on a power communication signal in a phase shift keying (hereinafter referred to as "PSK") modulation mode may also be used. But just like the FSK modulation mode, it can be only used in the PSK modulation mode.

SUMMARY

The present invention provides a receiving circuit, a transmitting circuit, a micro-controller, and a method for power line carrier communication, so that the present invention can solve the defect of supporting only one modulation or demodulation mode in a conventional power line carrier communication system, and can process a power line carrier signal in different modulation or demodulation modes.

The present invention provides a receiving circuit, including:
an analog amplifier, configured to connect with a power line coupling circuit, receive and amplify a power line carrier signal;
a receiving filter which connects with the analog amplifier, configured to filter the power line carrier signal output by the analog amplifier;
an analog-to-digital converter which connects with the receiving filter, configured to convert the filtered power line carrier signal output by the receiving filter into digital signals;
a digital mixer which connects with the analog-to-digital converter, configured to mix the digital signals;
a digital filter which connects with the digital mixer, configured to filter the mixed digital signals output by the digital mixer; and
a digital demodulator which connects with the digital filter, configured to perform FSK demodulation or PSK demodulation on the digital signals filtered by the digital filter, and output the demodulated signals.

The present invention provides a transmitting circuit, including: a digital modulator, a gain controller, a digital-to-analog converter, a transmitting filter, and a transmitting amplifier connected successively;
the digital modulator is configured to perform FSK modulation or PSK modulation on digital signals; the gain controller is configured to amplify the modulated signals output by the digital modulator; the digital-to-analog converter is configured to convert the amplified digital signals output by the gain controller into an analog signal; the transmitting filter is configured to filter the analog signal output by the digital-to-analog converter; and the transmitting amplifier is configured to amplify the filtered analog signal output by the transmitting filter to form a power line carrier signal and output the power line carrier signal.

The present invention provides a micro-controller, including a central processor and a receiving circuit, where the receiving circuit includes:
an analog amplifier, configured to connect with a power line coupling circuit, receive and amplify a power line carrier signal;
a receiving filter which connects with the analog amplifier, configured to filter the power line carrier signal output by the analog amplifier;

an analog-to-digital converter which connects with the receiving filter, configured to convert the filtered power line carrier signal output by the receiving filter into digital signals;

a digital mixer which connects with the analog-to-digital converter, configured to mix the digital signals;

a digital filter which connects with the digital mixer, configured to filter the mixed digital signals output by the digital mixer;

a digital demodulator which connects with the digital filter, configured to perform FSK demodulation or PSK demodulation on the digital signals filtered by the digital filter, and output the demodulated signal; and the central processor connects with the digital demodulator of the receiving circuit, and is configured to provide a demodulation control signal to the digital demodulator, so that the digital demodulator can select an FSK demodulation mode or a PSK demodulation mode.

The present invention provides another micro-controller, including a central processor and a transmitting circuit, where the transmitting circuit includes: a digital modulator, a gain controller, a digital-to-analog converter, a transmitting filter, and a transmitting amplifier connected successively;

the digital modulator is configured to perform FSK modulation or PSK modulation on digital signals; the gain controller is configured to amplitude-adjust the modulated signals output by the digital modulator; the digital-to-analog converter is configured to convert the amplitude-adjusted digital signals output by the gain controller into an analog signal; the transmitting filter is configured to filter the analog signal output by the digital-to-analog converter; and the transmitting amplifier is configured to amplify the filtered analog signal output by the transmitting filter to form a power line carrier signal and output the power line carrier signal; and the central processor connects with the digital modulator of the transmitting circuit, and is configured to provide a modulation control signal to the digital modulator, so that the digital modulator can select an FSK modulation mode or a PSK modulation mode.

The present invention provides a method for power line carrier communication, including:

reading a demodulated signal from a demodulation control register; and transmitting a demodulation control signal to the demodulation control register when it is decided that the demodulated signal does not match a default signal form, to change an FSK demodulation mode or a PSK demodulation mode for a receiving circuit and perform demodulation on a power line carrier signal.

The present invention provides another method for power line carrier communication, including:

receiving a demodulation control signal sent by a demodulation control register; and changing the current demodulation mode according to the demodulation control signal, to perform FSK demodulation or PSK demodulation on a received power line carrier signal, where the demodulation control signal is generated by a central processor when it is decided that the demodulated signal does not match the default signal form.

The receiving circuit of the present invention supports the FSK and PSK demodulation modes, and the transmitting circuit supports the FSK and PSK modulation modes. The corresponding demodulation or modulation mode may be selected to perform correct demodulation or modulation on the received power line carrier signal or the digital signal, that is, it can be achieved to perform demodulation on the power line carrier signal in different modulation modes by setting the demodulation mode of the receiving circuit, and it can also be achieved to perform modulation on the digital signal in different types by setting the modulation mode of the transmitting circuit. Based on the above technical solution, the micro-controller and the method for power line carrier communication according to the embodiments of the present invention may perform demodulation on the power line carrier signal in different modulation modes, and may also perform FSK or PSK modulation on the digital signal, thereby overcoming the defect of supporting only one demodulation or modulation mode in the conventional power line carrier communication system.

BRIEF DESCRIPTION OF THE DRAWINGS

To illustrate the technical solutions in the embodiments of the present invention or the prior art more clearly, the accompanying drawings needed in the description of the embodiments or the prior art will be briefly described hereunder. Evidently, the accompanying drawings in the following description illustrate only some embodiments of the present invention, and those skilled in the art may obtain other accompanying drawings based on these accompanying drawings without creative efforts.

DETAILED DESCRIPTION

In order to make the objectives, technical solutions, and advantages of the embodiments of the present invention more comprehensible, the technical solutions in the embodiments of the present invention are hereinafter described clearly and completely with reference to the accompanying drawings in the embodiments of the present invention. It is evident that the described embodiments are only part of the embodiments of the present invention, but not all of the embodiments. Other embodiments that those skilled in the art obtain based on the embodiments of the present invention without creative efforts are all within the protection scope of the present invention.

Embodiment 1

Figure 1:
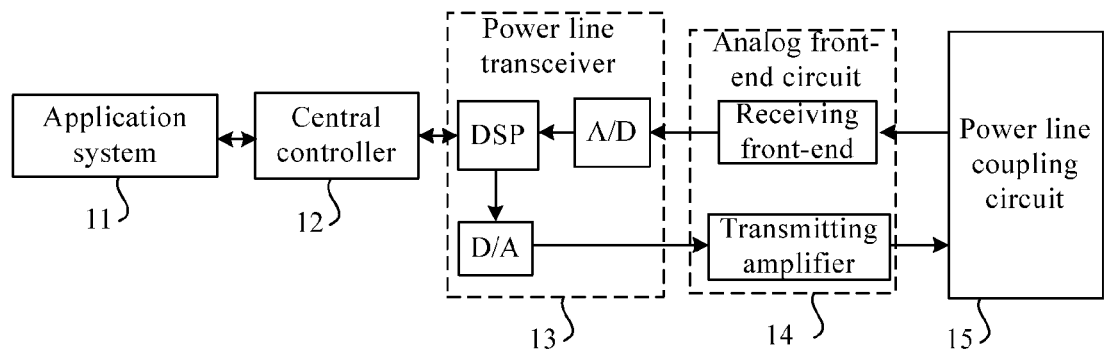
FIG. 1 is a schematic structural diagram of a conventional power line carrier communication system.
Figure 2:
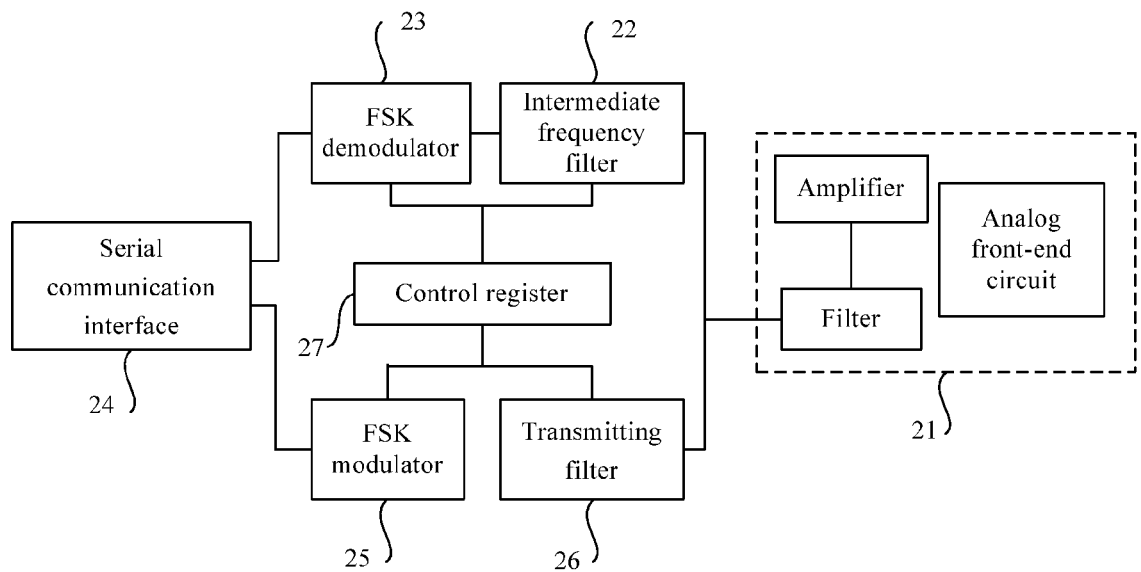
FIG. 2 is a schematic structural diagram of another conventional power line carrier communication system.
Figure 3:
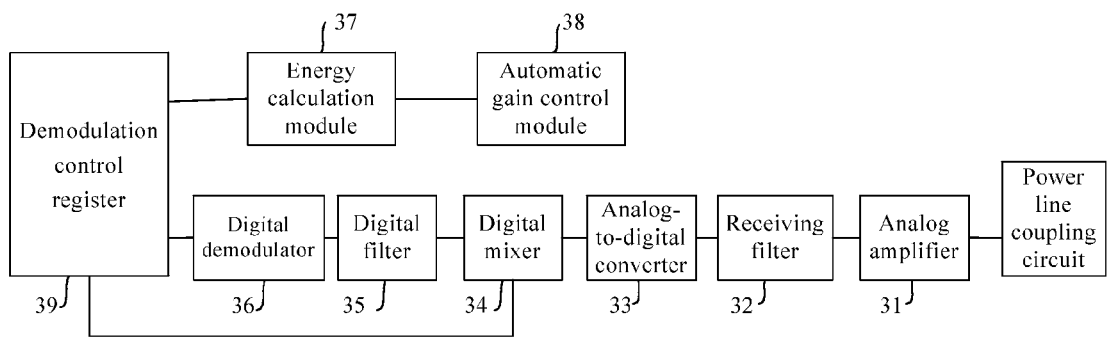
FIG. 3 is a schematic structural diagram of a receiving circuit according to Embodiment 1 of the present invention.

FIG. 3 is a schematic structural diagram of a receiving circuit according to Embodiment 1 of the present invention. As shown in FIG. 3, the receiving circuit of this embodiment includes: an analog amplifier 31, a receiving filter 32, an analog-to-digital converter 33, a digital mixer 34, a digital filter 35, and a digital demodulator 36 connected successively.

The analog amplifier 31 connects with a power line coupling circuit, receives a power line carrier signal from the power line coupling circuit, and adjusts (amplifies or attenuates) the power line carrier signal.

Because the front-end power line carrier signal has a great number of noise amplitudes and varieties, the receiving filter 32 filters the power line carrier signal amplified by the analog amplifier 31, to filter out some of the noise. Then, the analog-to-digital converter 33 converts the analog power line carrier signal into digital signals, to meet the processing requirement of the following digital circuit. Typically, the receiving filter 32 usually selects a bandpass filter to mainly filter out out-of-band noise.

The digital mixer 34 mixes the digital signals output by the analog-to-digital converter 33, and provides the mixed signals to the digital filter 35 to perform digital filtering. Subsequently, the digital demodulator 36 performs demodulation on the filtered digital signals output by the digital filter 35, and may select FSK demodulation or PSK demodulation. The digital demodulator 36 may select the demodulation mode suitable for the digital signal, perform demodulation on the digital signals, and output the demodulated signal. For example, if the modulation mode of the power line carrier signal is known in advance, the demodulation mode of the digital demodulator may be set in advance when the digital demodulator is installed. Alternatively, after the modulation mode of the power line carrier signal is known according to decision on a receiving signal, the demodulation mode of the digital demodulator may also be changed via a control instruction, where the control instruction is generally provided by a micro-controller or a central processor.

In this embodiment, the mixing parameter of the digital mixer 34 and the filtering parameter of the digital filter 35 may be set or modified, so that the parameters may adapt to the demodulation mode of the digital demodulator 36, and they may be set or modified according to the control signal sent by the micro-controller or the central processor. For example, if the digital demodulator 36 operates in an FSK demodulation mode, the digital mixer 34 selects to mix the digital signals to 270 KHz according to the control signal of the central processor. Specifically, the digital mixer 34 may obtain the required signal frequency by multiplying an input signal by a local oscillation signal of the digital mixer 34 and properly adjusting the frequency of the local oscillation signal of the digital mixer 34. The frequency of the mixed signal of the digital mixer 34 needs to adapt to the digital filter 35, that is, the frequency is within a passband range of the digital filter 35, and it is preferred that the frequency of the mixed signal is at the center frequency of the digital filter 35. For example, when the corresponding frequency of the mixed signal is 270 KHz, the digital filter 35 may be a bandpass filter with 285 KHz upper side frequency, 255 KHz lower side frequency, and 30 KHz passband width. When the digital demodulator 36 operates in a PSK demodulation mode, the digital mixer 34 may adjust the mixing frequency to 131 KHz according to the first control signal of the central processor, and the digital filter 35 may modify the filtering parameter correspondingly according to the second control signal sent by the central processor so that it has 141 KHz upper side frequency, 121 KHz lower side frequency, and 20 KHz passband width. The first control signal corresponds to the second control signal to achieve the purpose of modifying the parameters of the digital mixer and the digital filter successfully.

In the implementation, the receiving circuit of this embodiment may include a two-channel demodulation circuit and a switch circuit. The two-channel demodulation circuit is an FSK demodulation circuit and a PSK demodulation circuit respectively; the switch circuit connects with the FSK demodulation circuit and the PSK demodulation circuit respectively, and is configured to select the power line carrier signal to access the FSK demodulation circuit or the PSK demodulation circuit under the trigger of a demodulation control signal, that is, the receiving circuit performs FSK or PSK demodulation on the power line carrier signal. This embodiment does not limit the implementation structure of the receiving circuit, e.g., the FSK demodulation circuit and the PSK demodulation circuit may also be implemented by a core circuit module in conjunction with a periphery circuit. This embodiment is merely a preferred solution.

The receiving circuit of this embodiment has the FSK and PSK demodulation modes, and demodulation may be performed on the power line carrier signal in the different modulation modes by setting the demodulation mode of the receiving circuit by the central processor, thereby overcoming the defect of supporting to perform demodulation on the power line carrier signal in only one modulation mode in the conventional power line carrier communication system. In addition, compared with the prior art, the receiving circuit of this embodiment has many processing steps that the analog amplifier, the receiving filter, and the digital filter perform the analog amplifying, analog filtering, and digital filtering on the signal respectively, thereby improving the quality of the processed signal, and ensuring the accuracy of the demodulation result. Therefore the receiving circuit of the present invention can not only apply to a clean power line carrier communication environment, but also apply to a complex power noise environment.

Further, the receiving circuit of this embodiment also includes: a primary amplifier, a bandpass filter, and a secondary amplifier. The primary amplifier connects with the receiving filter 32; the bandpass filter connects with the primary amplifier; and the secondary amplifier connects with the bandpass filter and the analog-to-digital converter 33.

The primary amplifier is configured to receive and amplify the power line carrier signal output by the receiving filter 32, then provide the amplified power line carrier signal to the bandpass filter; the bandpass filter is configured to filter the power line carrier signal amplified by the primary amplifier, to further filter out the noise signal within the passband of the power line carrier signal; and the secondary amplifier is configured to once again amplify the power line carrier signal filtered by the bandpass filter, and transmit the once again amplified power line carrier signal to the analog-to-digital converter 33.

Specifically, the primary amplifier, the bandpass filter, and the secondary amplifier arranged between the receiving filter and the analog-to-digital converter are optional modules, which are mainly configured to further amplify and filter the power line carrier signal that is amplified by the analog amplifier 31 and filtered by the receiving filter 32, to capture the small signal that is amplified by the analog amplifier 31 and is filtered by the receiving filter 32, thereby improving the precision and accuracy of receiving the power line carrier signal, and ensuring the processing effect on the power line carrier signal.

It should be noted that the receiving circuit which does not include the above modules according to the embodiments of the present invention is taken as an example in the description, but those skilled in the art may implement the receiving circuit which includes the above modules in combination with their own knowledge in the embodiments of the present invention. Further, the receiving circuit of this embodiment also includes a demodulation control register 39.

The demodulation control register 39 connects with the digital demodulator 36, the digital mixer 34, and the digital filter 35. The demodulation control register 39 is configured to provide the demodulation control signal to the digital demodulator 36, so that the digital demodulator 36 selects the FSK demodulation mode to perform demodulation on the received digital signals, or selects the PSK demodulation mode to perform demodulation on the received digital signals.

The demodulation control register 39 connects with the central processor; the demodulation control signal may come from the central processor; and the demodulation control signal is configured to instruct the digital demodulator 36 to select the demodulation mode (e.g., FSK or PSK) to perform demodulation on the digital signals. In addition, the demodulation control register 39 transmits the mixing parameter (e.g., the mixed central frequency) suitable for the demodulation control signal to the digital mixer 34 while the demodulation control register 39 transmits the demodulation control signal to the digital demodulator 36; and transmits the filtering parameter (e.g., frequency, bandwidth) suitable for the demodulation control signal to the digital filter 35, and the mixing parameter or the filtering parameter may also be determined by the central processor. For example, if the digital demodulator 36 operates in the FSK demodulation mode, the operating parameters of the digital mixer 34 and the digital filter 35 should be set so that the digital demodulator 36 can perform FSK demodulation on the output signals that is processed by the digital mixer 34 and the digital filter 35.

Further, the receiving circuit of this embodiment also includes: an energy calculation module 37 and an automatic gain control module 38.

The energy calculation module 37 connects with the digital demodulator 36 and the automatic gain control module 38. The digital demodulator 36 provides the output demodulated signals to the energy calculation module 37 at the same time; and the energy calculation module 37 calculates an energy value of the demodulation signals output by the digital demodulator 36, and provides the calculated energy value of the signals to the automatic gain control module 38.

The automatic gain control module 38 connects with the analog amplifier 31; and the automatic gain control module 38 determines the amplification coefficient of the analog amplifier 31. Specifically, the automatic gain control module 38 generates an amplification parameter control signal according to the energy value of the digital signals calculated by the energy calculation module 37, and provides the amplification parameter control signal to the analog amplifier 31, to adjust the amplification parameter of the analog amplifier 31, thus performing an amplifying processing on the power line carrier signal. By using the method provided by this embodiment to adjust the amplification parameter of the analog amplifier 31, the amplification effect for the analog amplifier 31 on the power line carrier signal can be improved, and a back-end digital filter and digital demodulation circuit can be guaranteed effectively. The analog amplifier of this embodiment may be made up of a low noise amplifier and a plurality of (generally two) programmable amplifiers in a cascaded way.

Further, in the receiving circuit of this embodiment, the energy calculation module 37 also connects with the demodulation control register 39, and is configured to provide the calculated energy value of the signal to the demodulation control register 39; and the demodulation control register 39 may display the energy value of the signal to users so that they can adjust the receiving circuit according to the observed energy value of the signal, to further improve the accuracy of the demodulation signal.

The receiving circuit provided by this embodiment may be implemented as a separate circuit unit with demodulation function, and may also be integrated into the micro-controller.

Embodiment 2

Figure 4A:
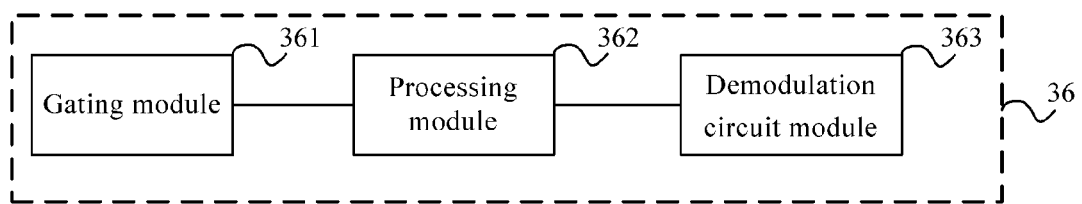
FIG. 4A is a schematic structural diagram of a digital demodulator according to Embodiment 2 of the present invention.
Figure 4B:
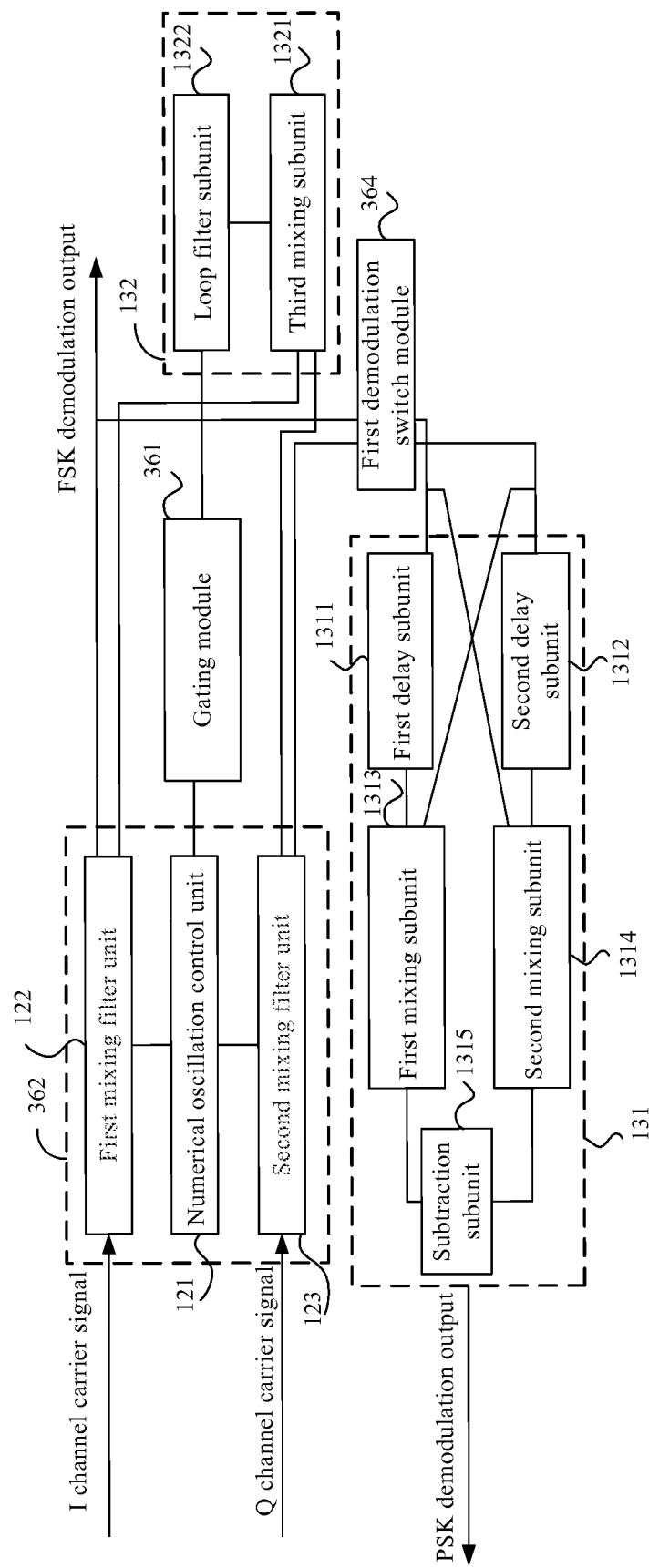
FIG. 4B is a schematic structural diagram of an implementation of the digital demodulator as shown in FIG. 4A.

FIG. 4A is a schematic structural diagram of a digital demodulator in Embodiment 2 of the present invention. FIG. 4B is a schematic structural diagram of an implementation of the digital demodulator as shown in FIG. 4A. This embodiment is implemented based on Embodiment 1, and provides an implementation structure of the digital demodulator 36. As shown in FIG. 4A and FIG. 4B, the digital demodulator 36 includes: a gating module 361, a processing module 362, and a demodulation circuit module 363.

The gating module 361 connects with the central processor, and is configured to receive the demodulation control signal provided by the central processor and select a power line carrier demodulation mode for the input filtered digital signals according to the demodulation control signal; and the gating module 361 is configured beforehand with selection information in at least two power line carrier demodulation modes. The processing module 362 connects with the gating module 361, and is configured to perform a quadrature processing and a filtering processing on the input filtered digital signals successively to achieve a filtered quadrature signal, and output the quadrature signal to the demodulation circuit module 363 corresponding to the power line carrier demodulation mode determined by the gating module 361. The demodulation circuit module 363 connects with the processing module 362, and is configured to perform demodulation on the quadrature signal to derive and output a demodulated signal.

In this embodiment, the gating module 361 is specifically a select register. In practice, the gating module 361 may be used to save an algorithm and the selection information corresponding to the power line carrier demodulation mode. For example, the selection information may select status information such as digital logic "0" or "1". The selection information is configured to indicate that the receiving circuit will perform demodulation on an input carrier signal according to the algorithm corresponding to which demodulation mode, and output the demodulated signal. By using the gating module 361 configured to determine the demodulation mode, when it is necessary to perform demodulation on the input carrier signal, the receiving circuit firstly sets the status of the gating module 361, to determine the demodulation mode to perform demodulation on the carrier signal. It should be noted that, specifically, according to the environment in which a power line carrier communication system runs, the demodulation control signal provided by the central processor may configure for the gating module 361 to select the demodulation mode.

In this embodiment, the power line carrier demodulation mode for the filtered signals can be selected. The demodulation control signal provided by the central processor via the demodulation control register controls the gating module 361 to select the power line carrier demodulation mode, perform the quadrature processing and the filtering processing on the carrier signals successively to get the filtered quadrature signals, and output the quadrature signals to a demodulation circuit corresponding to the power line carrier demodulation mode determined by the gating module; and the demodulation circuit performs demodulation on the quadrature signals to derive and output the demodulated signal, thereby solving the problem that the power line carrier communication system demodulation mode in the prior art is relatively flat, that is, the present invention enables to support multiple demodulation modes, so that a user can select the demodulation mode flexibly, the use cost of the user is reduced effectively, and the convenience of the user's use is improved.

Further, the processing module 362 in this embodiment includes: a numerical oscillation control unit 121, a first mixing filter unit 122, and a second mixing filter unit 123. The numerical oscillation control unit 121 connects with the gating module 361, and is configured to generate and output local quadrature signals; and the local quadrature signals include a first local quadrature signal and a second local quadrature signal. The first mixing filter unit 122 connects with the numerical oscillation control unit 121, and is configured to perform the quadrature processing and the filtering processing on the input filtered digital signals according to the first local quadrature signal, to derive a filtered first quadrature signals, and output the filtered first quadrature signals to the demodulation circuit module 363 corresponding to the power line carrier modulation mode determined by the gating module 361. The second mixing filter unit 123 connects with the numerical oscillation control unit 121, and is configured to perform the quadrature processing and the filtering processing on the input filtered digital signals according to the second local quadrature signal, to derive a filtered second quadrature signals, and output the filtered second quadrature signals to the demodulation circuit module 363 corresponding to the power line carrier modulation mode determined by the gating module 361.

In this embodiment, the numerical oscillation control unit 121 may specifically be a numerical controlled oscillator (hereinafter referred to as "NCO") 121. As such, the first local quadrature signal output by the NCO 121 may specifically be a cosine signal generated by the NCO, and the second local quadrature signal may specifically be a sine signal generated by the NCO; the first mixing filter unit 122 includes a multiplier and a low pass filter (hereinafter referred to as "LPF"); and the second mixing filter unit 123 also includes a multiplier and a LPF. More specifically, in this embodiment, the LPF may be a finite impulse response (hereinafter referred to as "FIR") filter or an infinite impulse response (hereinafter referred to as "IIR") filter.

In this embodiment, the working process of the processing module 362 is as follows: the input carrier signals may specifically be divided into I channel carrier signals and Q channel carrier signals, where the I channel carrier signals are multiplied by the cosine signal output by the NCO 121 through the multiplier of the first mixing filter unit 122, to obtain the first quadrature signals and output them to the first mixing filter unit 122. The first quadrature signals may specifically be in-phase carrier signals. The first quadrature signals may be filtered by the LPF of the first mixing filter unit 122, to remove the high-frequency signals in the first quadrature signals and obtain the filtered first quadrature signals.

The Q channel carrier signals are multiplied by the sine signal output by the NCO 121 through the multiplier of the second mixing filter unit 123, to obtain the second quadrature signals and output them to the second mixing filter unit 123. The second quadrature signals may specifically be quadrature carrier signals. The second quadrature signals may be filtered by the LPF of the second mixing filter unit 123, to remove the high-frequency signals in the second quadrature signals and obtain the filtered second quadrature signals.

For example, in regard to the I channel carrier signals, the carrier signals include two kinds of frequency, i.e., 125 KHz and 135 KHz respectively. Meanwhile, the frequency of the cosine signal output by the NCO 121 is 130 KHz. The carrier signals with 125 KHz frequency are taken as an example in this embodiment. When the carrier signals with 125 KHz frequency are multiplied by the cosine signal output by the NCO 121 through the multiplier of the first mixing filter unit 122, it can be obtained that the frequency of the first quadrature signals is 255 Khz and 5 KHz respectively; then the carrier signals are filtered by the LPF of the first mixing filter unit 122 to filter out the signals with 255 KHz frequency, thus effectively eliminating high-frequency signal interference on the first quadrature signals.

In this embodiment, by setting the numerical oscillation control unit, the first mixing filter unit, and the second mixing filter unit, it can be achieved to perform the quadrature processing on the input filtered signals to obtain the first quadrature signals and the second quadrature signals respectively, and perform the filtering processing on the first quadrature signals and the second quadrature signals, thus effectively eliminating high frequency interference.

The demodulation modes including the FSK demodulation mode and the PSK demodulation mode which can be selected by the digital demodulator are taken as examples in this embodiment. The technical solutions of the present invention are described in detail.

When the gating module 361 selects the power line carrier demodulation mode which is specifically the FSK demodulation mode for the input filtered digital signals under control of the central processor, the demodulation circuit module 363 includes a first demodulation circuit unit 131; and the first demodulation circuit unit 131 includes: a first delay subunit 1311, a second delay subunit 1312, a first mixing subunit 1313, a second mixing subunit 1314, and a subtraction subunit 1315. The first delay subunit 1311 connects with the first mixing filter unit 122, and is configured to perform a delay processing on the received first quadrature signals to obtain the first delay quadrature signals; the second delay subunit 1312 connects with the second mixing filter unit 123, and is configured to perform the delay processing on the received second quadrature signals to obtain the second delay quadrature signals; the first mixing subunit 1313 connects with the first delay subunit 1311, and is configured to multiply the first delay quadrature signals by the second quadrature signals to obtain the first cross signals; the second mixing subunit 1314 connects with the second delay subunit 1312, and is configured to multiply the second delay quadrature signals by the first quadrature signals to obtain the second cross signals; and the subtraction subunit 1315 connects with the first mixing subunit 1313 and the second mixing subunit 1314, and is configured to subtract the first cross signals from the second cross signals, obtain the first demodulation signals, and output the first demodulation signals.

Further, when the gating module 361 selects the power line carrier demodulation mode which is specifically the PSK demodulation mode for the input filtered digital signals under control of the central processor, the demodulation circuit module 363 also includes a second demodulation circuit unit 132; and the second demodulation circuit unit 132 includes: a third mixing subunit 1321 and a loop filter subunit 1322. The third mixing subunit 1321 connects with the first mixing filter unit 122 and the second mixing filter unit 123, and is configured to multiply the first quadrature signals by the second quadrature signals to obtain the third quadrature signals; and the loop filter subunit 1322 connects with the third mixing subunit 1321, the numerical oscillation control unit 121, and the gating module 361, and is configured to perform the filtering processing on the third quadrature signals and output the third quadrature signals to the numerical oscillation control unit 121 to obtain the second demodulation signals. Specifically, the numerical oscillation control unit 121 specifically includes: an adder, a K-register, and a NCO control unit. Because the numerical value stored in the K-register is the setting value of the digital frequency of the numerical oscillation control unit 121, the frequency of the sine signals and the cosine signals generated by the numerical oscillation control unit 121 is adjusted by changing the numerical value stored in the K-register, and the adjusted sine signals are output as the second demodulation signals. The specific implementation is as follows: the filtered third quadrature signals and the numerical value stored in the K-register are input to the adder of the numerical oscillation control unit 121; the adder performs phase accumulation on phase information of the third quadrature signals according to the numerical value stored in the K-register, and transmits the accumulated phase information to the NCO control subunit, so that the NCO control subunit tunes the frequency of the sine signals and the cosine signals generated by the NCO according to the accumulated phase information, and therefore the sine signals and the cosine signals can keep track of the accumulated phase information; the frequency-tuned sine signals are multiplied by the input in-phase carrier signals through the multiplier of the first mixing filter unit 122, to obtain the second demodulation signals; and the obtained second demodulation signals are filtered by the LPF of the first mixing filter unit 122 to filter out the high-frequency signals, thus effectively eliminating high-frequency signals interference on the second demodulation signals.

Further, the digital demodulator also includes a first demodulation switch module 364, which connects with the first demodulation circuit unit 131 and the processing module 362. When the gating module 361 selects the power line carrier demodulation mode which is specifically the FSK demodulation mode for the input carrier signal, the first demodulation switch module 364 closes, so that the first demodulation circuit unit 131 connects with the processing module 362; and when the gating module 361 selects the power line carrier demodulation mode which is specifically the PSK demodulation mode for the input carrier signal, the first demodulation switch module 364 opens, so that the first demodulation circuit unit 131 disconnects with the processing module 362, and thus the first demodulation circuit unit 131 does not need to work when the PSK demodulation is performed, thereby improving the service life of the digital demodulator.

In the circuit implementation of the digital demodulator with the above function provided by the present invention, the modules, units, and subunits may be integrated together to form an integrated hardware circuit or a chip, or may also be arranged in the specific digital demodulator in a separate form, whatever form of the specific circuit or parts is adopted. Those skilled in the art may do an implementation according to the specific product design demand based on their own technical knowledge.

Embodiment 3

Figure 5:
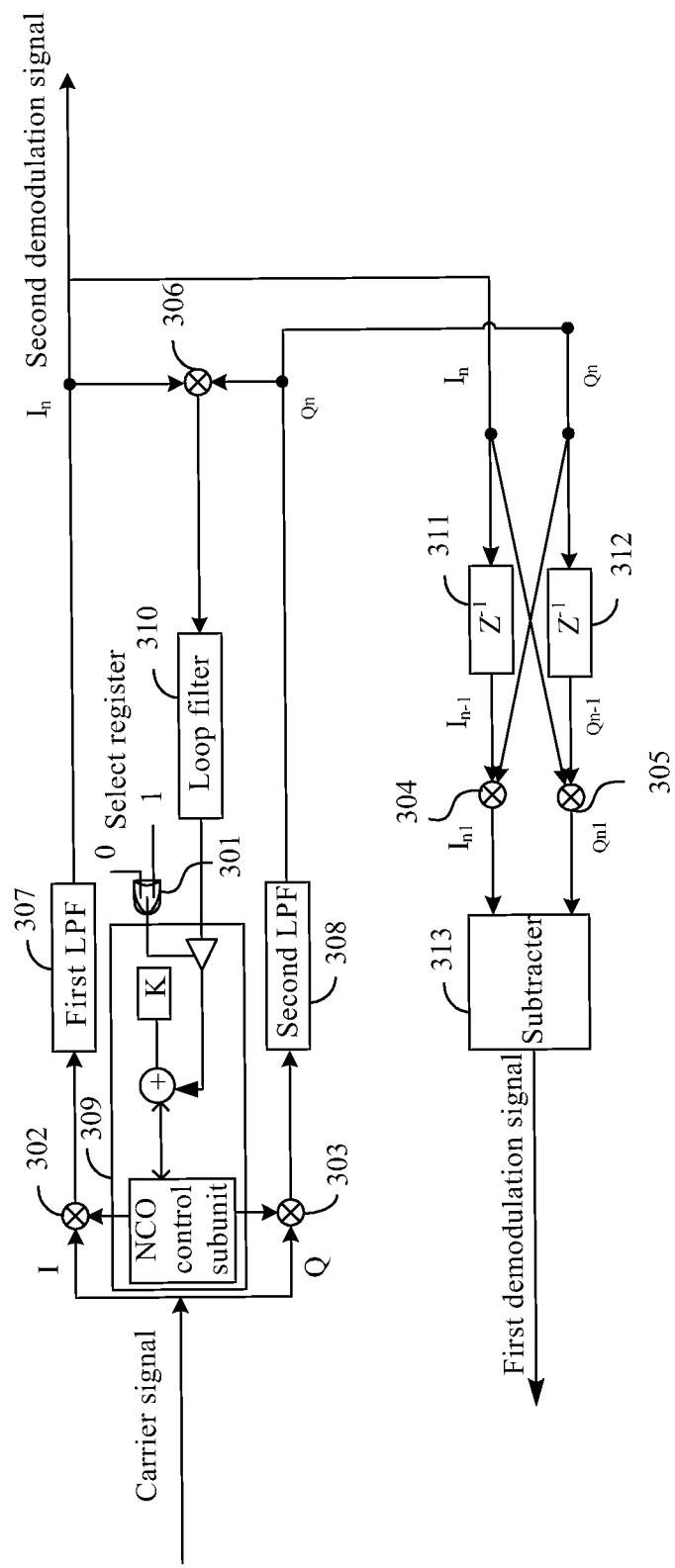
FIG. 5 is a schematic structural diagram of a digital demodulator according to Embodiment 3 of the present invention.

FIG. 5 is a schematic structural diagram of a digital demodulator according to Embodiment 3 of the present invention. This embodiment is implemented based on the first embodiment, and provides another implementation structure of the digital demodulator 36. As shown in FIG. 5, the digital demodulator of this embodiment includes: a select register 301, a first multiplier 302, a second multiplier 303, a third multiplier 304, a fourth multiplier 305, a fifth multiplier 306, a first LPF 307, a second LPF 308, an NCO 309, a loop filter 310, a first delay unit 311, a second delay unit 312, and a subtracter 313.

The select register 301 may connect with the central processor or the demodulation control register, and is configured to receive the demodulation control signal. The select register 301 may select the specific configuration according to the demodulation control signal.

Specifically, the working process of the digital demodulator is as follows: when the select register 301 configures to "1", the loop filter 310 is switched on, that is, the select register 301 gates a Costas loop in a circuit. At this point, the digital demodulator selects the PSK demodulation mode, and the carrier signals are divided into I channel and Q channel, i.e., carrier signal I and carrier signal Q. The carrier signal I is multiplied by the cosine signal (i.e., the first local quadrature signals as described in the embodiments of the present invention) generated by the NCO 309 through the first multiplier 302 to obtain the first quadrature signals, and the first quadrature signals are output to the first LPF 307. The first quadrature signals are in-phase carrier signals; and the high-frequency signals are filtered out from the first quadrature signals through the first LPF 307 to derive the first quadrature signal $I_n$. The carrier signal Q is multiplied by the sine signal (i.e., the second local quadrature signals as described in the embodiments of the present invention) generated by the NCO 309 through the second multiplier 303 to obtain the second quadrature signals, and the second quadrature signals are output to the second LPF 308. The second quadrature signals are quadrature carrier signals; and the high-frequency signals are filtered out from the second quadrature signals through the second LPF 308 to derive the second quadrature signal $Q_n$. After the first quadrature signal $I_n$ is multiplied by the second quadrature signal $Q_n$ through the fifth multiplier 306, the third quadrature signals are output; and the third quadrature signals are filtered by the loop filter 310 once again, and the filtered third quadrature signals are output to the NCO 309. Specifically, the NCO 309 mainly includes an adder, a K-register, and a NCO control subunit; first, the third quadrature signals and the numerical value stored in the K-register are transmitted to the adder, so that the adder performs phase accumulation on phase information of the third quadrature signals according to the numerical value stored in the K-register, and transmits the accumulated phase information to the NCO control subunit; the NCO control subunit tunes the frequencies of the sine signals and the cosine signals generated by the NCO control subunit according to the accumulated phase information, so that the sine signals and the cosine signals can keep track of the accumulated phase information. In addition, the frequency-tuned sine signals are multiplied by the input in-phase carrier signals through the first multiplier 302, to obtain the second demodulation signals; and the second demodulation signals are filtered by the first LPF 307 to filter out the high-frequency signals of the second demodulation signals. As such, the filtered second demodulation signals output from the first LPF 307 are the signals which are output in the PSK demodulation mode.

When the select register 301 configures to "0", the loop filter 310 is disconnected, that is, the Costas loop is disconnected. At this point, the digital demodulator selects the FSK demodulation mode, and the carrier signals are divided into I channel and Q channel, i.e., carrier signal I and carrier signal Q. The carrier signal I is multiplied by the cosine signal (i.e., the first local quadrature signals as described in the embodiments of the present invention) generated by the NCO 309 through the first multiplier 302 to obtain the first quadrature signals, and the first quadrature signals are output to the first LPF 307. The first quadrature signals are the in-phase carrier signals; and the high-frequency signals are filtered out from the first quadrature signals through the first LPF 307 to derive the first quadrature signal $I_n$. The carrier signal Q is multiplied by the sine signal (i.e., the second local quadrature signals as described in the embodiments of the present invention) generated by the NCO 309 through the second multiplier 303 to obtain the second quadrature signals, and the second quadrature signals are output to the second LPF 308. The second quadrature signals are the quadrature carrier signals; and the high-frequency signals are filtered out from the second quadrature signals through the second LPF 308 to derive the second quadrature signal Qn. The first delay unit 311 and the second delay unit 312 perform a delay processing on the first quadrature signal $I_n$ and the second quadrature signal $Q_n$ respectively, to derive a first delay quadrature signal $I_{n-1}$ and a second delay quadrature signal $Q_{n-1}$. The first delay quadrature signal $I_{n-1}$ is multiplied by the second quadrature signal $Q_n$ through the third multiplier 304, to derive a first cross signal $I_{n1}$. The second delay quadrature signal $Q_{n-1}$ is multiplied by the first quadrature signal $I_n$ through the fourth multiplier 305, to derive a second cross signal $Q_{n1}$. After the subtracter 313 subtracts the first cross signal $I_{n1}$ from the second cross signal $Q_{n1}$, the first demodulation signals are derived and output. The first demodulation signals are the signals which are output after demodulation is performed in the FSK demodulation mode.

Embodiment 4

Figure 6:
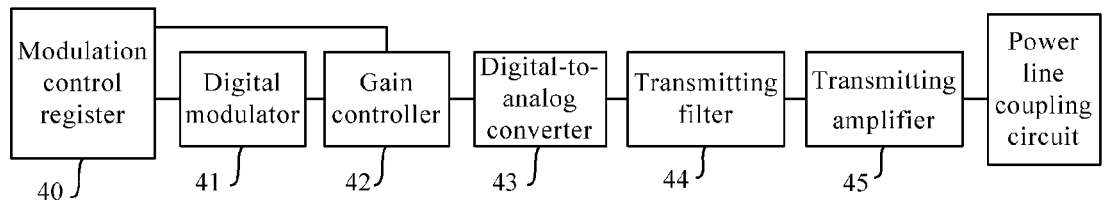
FIG. 6 is a schematic structural diagram of a transmitting circuit according to Embodiment 4 of the present invention.

FIG. 6 is a schematic structural diagram of a transmitting circuit according to Embodiment 4 of the present invention. As shown in FIG. 6, the transmitting circuit of this embodiment includes: a digital modulator 41, a gain controller 42, a digital-to-analog converter 43, a transmitting filter 44, and a transmitting amplifier 45 connected successively.

The digital modulator 41 is configured to receive digital signals and perform FSK modulation or PSK modulation on the digital signals. The digital modulator 41 supports two modulation modes, and the digital modulator may be controlled to select the corresponding modulation mode according to the actual demand. Generally, the modulation mode of the digital modulator 41 is controlled by a modulation control signal of a central processor.

The gain controller 42 is configured to amplitude-adjust the modulated signals output by the digital modulator 41, and output the amplitude-adjusted signals to the digital-to-analog converter 43. Specifically, the gain controller 42 may be implemented by a multiplier, and it is mainly to adjust the amplitude of the input digital signals, so that the amplitude of the output digital signals conforms to the subsequent requirement of the digital-to-analog converter 43. For example, if the amplitude of the digital signals is too big, the amplitude of the digital signals will be compressed; otherwise, if the amplitude of the digital signals is too small, the amplitude of the digital signals will be amplified. Typically, the gain range of the gain controller 42 is 2-128, that is, the amplitude of the output digital signals is controlled by the value of the digital codes output. Generally, the gain range of the gain controller is 0-30 dB. The digital-to-analog converter 43 is configured to convert the signals output by the gain controller 42 into an analog signal, to adapt to the processing requirement of a back-stage circuit.

The transmitting filter 44 is configured to filter the received analog signal, e.g., a low pass filter may be used to filter out the high frequency noise signals in the analog signal, e.g., the signals of more than 500 KHz may be filtered out; in addition, an original staircase waveform is changed into a sine waveform after through the transmitting filter 44, which can have the effect of waveform shaping. The transmitting amplifier 45 may choose a power amplifier, and is configured to amplify the filtered analog signal output by the transmitting filter 44 to form a power line carrier signal and output the power line carrier signal. For example, the signal of 0.4V amplitude value may be acquired after the signal of 0.6V amplitude value is filtered by the transmitting filter 44. At this point, the transmitting amplifier 45 may amplify the signal to the original amplitude value 0.6V; and may transmit the amplified power line carrier signal to a power line coupling circuit, through which the power line carrier signal will be sent out. The amplification gain of the transmitting amplifier 45 needs to be modified and set in combination with a front-stage transmitting filter circuit. For example, if the signal attenuation of the transmitting filter at this moment is small, it can meet the demand when the transmitting amplifier gain is set to 12 dB; and if the performance of the transmitting filter becomes poor at the next moment and the signal attenuation increases, it is necessary to increase the transmitting amplifier gain, e.g., the transmitting amplifier gain needs to be set to 18 dB. The above description is only an example to show that the transmitting amplifier gain needs to be set according to the status of the front-stage circuit, and is not intended to limit the gain range of the transmitting amplifier in the present invention.

The transmitting circuit of this embodiment has the FSK modulation mode or PSK modulation mode; the modulation mode of the transmitting circuit may be set by the modulation control signal of the central processor; to perform modulation on the digital signals in different modes, thereby overcoming the defect of supporting to perform modulation on the digital signals in only one modulation mode in conventional microcontrollers. In addition, the transmitting circuit of this embodiment can perform the processing operation including many steps that the gain controller, the transmitting filter, and the transmitting amplifier perform digital amplifying, analog filtering, and analog amplifying on the signal respectively, thereby ensuring the quality of the modulated output signal. Therefore, the transmitting circuit of this embodiment can not only apply to a clean power line carrier communication environment, but also apply to a power line carrier environment with large noise.

Further, the transmitting circuit of this embodiment also includes a modulation control register 40. The modulation control register 40 connects with the digital modulator 41 and the gain controller 42, and is configured to transmit the modulation control signal to the digital modulator 41, so that the digital modulator 41 may perform FSK or PSK modulation according to the modulation control signal. The modulation control register 40 connects with the central processor, and the modulation control signal may come from the central processor. The modulation control register 40 provides the gain controller 42 with an amplification parameter corresponding to the modulation control signal while the modulation control register 40 transmits the modulation control signal to the digital modulator 41. Specifically, the amplification parameter is generated according to the control signal of the central processor. For example, when the modulation control register 40 transmits the modulation control signal, on which the digital modulator 41 is controlled to perform the FSK modulation, to the digital modulator 41, the amplification parameter (generally, the amplification factor is selected to be 0-30 dB) suitable for the FSK modulation mode is provided to the gain controller 42, that is, the gain controller 42 may perform the optimal amplifying processing on the modulated signals output by the digital modulator 41 according to the amplification parameter; and when the modulation control register 40 transmits the PSK modulation control signal, the amplification parameter (e.g., the amplification parameter is preferably set to be 0-30 dB) suitable for the PSK modulation mode is also provided to the gain controller 42.

This embodiment provides a specific implementation of the digital modulator 41 in the transmitting circuit as follows: the digital modulator 41 may specifically be implemented by a transmitter with variable frequency and phase. A carrier signal generator in the transmitter may generate the carrier signal with variable frequency, may also generate the carrier signal with variable phase, and may automatically generate the corresponding carrier signal according to the modulation control signal that comes from the central processor or is provided by the modulation control register, thus performing modulation on the digital signals. It should be noted that, with reference to the schematic structural diagram of the digital demodulator according to Embodiment 2 of the present invention, those skilled in the art may devise the digital modulator in the transmitting circuit provided by the present invention based on their own technical knowledge.

The modulation mode of the transmitting circuit of this embodiment may be set by the central processor via the modulation control register, so it is simple to implement. In addition, the modulation control signal provided by the modulation control register may closely combine with the practical application, thereby improving the applicability of the transmitting circuit of this embodiment.

Embodiment 5

Figure 7:
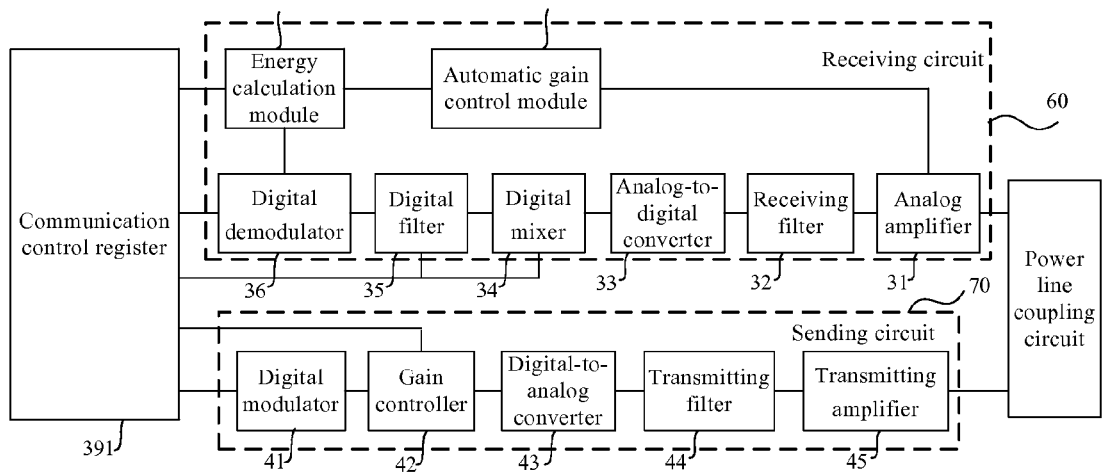
FIG. 7 is a schematic structural diagram of a power line carrier communication device according to Embodiment 5 of the present invention.

FIG. 7 is a schematic structural diagram of a power line carrier communication device according to Embodiment 5 of the present invention. This embodiment is implemented based on Embodiments 1, 2, 3, and 4. As shown in FIG. 7, the power line carrier communication device of this embodiment includes: a receiving circuit 60 and a transmitting circuit 70. The specific implementation of the receiving circuit 60 is as shown in FIG. 3, and the specific implementation of the transmitting circuit 70 is as shown in FIG. 6, and thus they will not be described in detail in this embodiment. A demodulation control register and a modulation control register may be implemented separately, or implemented in the same register. The same register is taken as an example in this embodiment, i.e., a communication control register 391 as shown in FIG. 7.

Based on the above embodiments, the power line carrier communication device of this embodiment can integrate the two separate circuits of the transmitting circuit and the receiving circuit as a whole, can perform demodulation on the power line carrier signal of the different modulation modes, and can perform modulation on the digital signals in different modes, thereby overcoming the defect of supporting only one modulation or demodulation mode in the conventional microcontrollers; and because the transmitting circuit and the receiving circuit are two separate circuits, a full-duplex communication mode can be achieved.

Embodiment 6

Figure 8A:
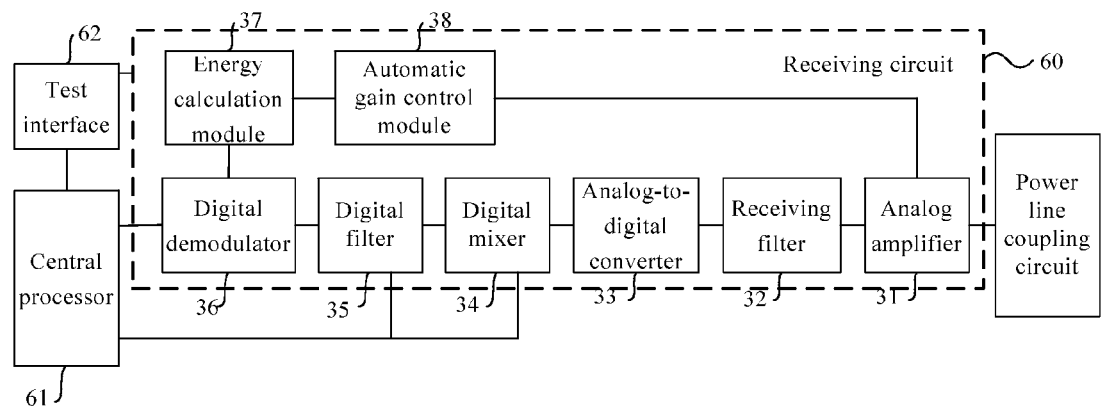
FIG. 8A is a schematic structural diagram of a micro-controller according to Embodiment 6 of the present invention.
Figure 8B:
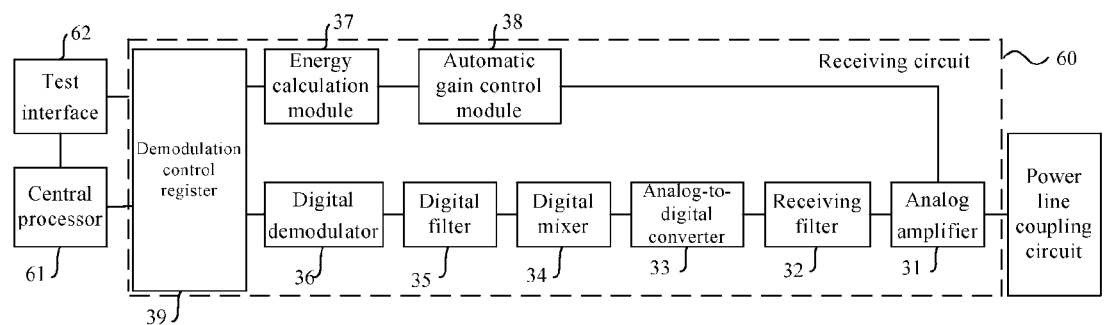
FIG. 8B is another schematic structural diagram of the micro-controller according to Embodiment 6 of the present invention.

FIG. 8A is a schematic structural diagram of a microcontroller according to Embodiment 6 of the present invention, and FIG. 8B is another schematic structural diagram of the micro-controller according to Embodiment 6 of the present invention. As shown in FIG. 8A, the micro-controller of this embodiment includes: a central processor 61 and a receiving circuit 60, where the central processor 61 connects with the receiving circuit 60.

The receiving circuit 60 includes: an analog amplifier 31, a receiving filter 32, an analog-to-digital converter 33, a digital mixer 34, a digital filter 35, and a digital demodulator 36 connected successively. The analog amplifier 31 is configured to connect with a power line coupling circuit, receive a power line carrier signal, and amplify the power line carrier signal; the receiving filter 32 connects with the analog amplifier 31, and is configured to filter the power line carrier signal output by the analog amplifier 31; and the analog-to-digital converter 33 connects with the receiving filter 32, and is configured to convert the filtered power line carrier signal output by the receiving filter 32 into digital signals.

The digital mixer 34 connects with the analog-to-digital converter 33, and is configured to mix the digital signals; the digital filter 35 connects with the digital mixer 34, and is configured to filter the mixed digital signals output by the digital mixer 34; and the digital demodulator 36 connects with the digital filter 35, and is configured to perform FSK or PSK demodulation on the filtered digital signals output by the digital filter 35 and output the demodulated signal to the central processor 61.

The central processor 61 connects with the digital demodulator 36, and is configured to provide a demodulation control signal to the digital demodulator 36, so that the digital demodulator 36 selects an FSK demodulation mode or a PSK demodulation mode.

Further, the receiving circuit of this embodiment also includes: a primary amplifier, a bandpass filter, and a secondary amplifier arranged between the receiving filter and the analog-to-digital converter. The primary amplifier is configured to receive the power line carrier signal output by the receiving filter 32, further amplify the power line carrier signal, and provide the amplified power line carrier signal to the bandpass filter; the bandpass filter is configured to filter the power line carrier signal amplified by the primary amplifier, to further filter out the noise signal within the passband of the power line carrier signal; and the secondary amplifier is configured to once again amplify the power line carrier signal filtered by the bandpass filter, and transmit the once again amplified power line carrier signal to the analog-to-digital converter 33. They are mainly configured to capture the small signal that is amplified by the analog amplifier 31 and is filtered by the receiving filter 32, thereby improving the precision and accuracy of receiving the power line carrier signal, and ensuring the processing effect on the power line carrier signal.

It should be noted that, the primary amplifier, the bandpass filter, and the secondary amplifier are optional modules, and the receiving circuit which does not include the above modules according to this embodiment and the following embodiments is taken as an example in the description.

Further, the receiving circuit 60 of this embodiment also includes a demodulation control register 39, as shown in FIG. 8B. The demodulation control register 39 connects with the central processor 61; the central processor 61 performs a read-write operation on the demodulation control register 39 via a variety of buses (a data bus, an address bus, or a control bus); and the demodulation control register 39 also connects with the digital demodulator 36, to provide the demodulation control signal to the digital demodulator 36.

Further, the receiving circuit 60 of this embodiment also includes: an energy calculation module 37 and an automatic gain control module 38. The energy calculation module 37 connects with the digital demodulator 36, and is configured to calculate an energy value of the demodulated signals output by the digital demodulator; the automatic gain control module 38 connects with the energy calculation module 37 and the analog amplifier 31, and is configured to generate an amplification parameter control signal according to the energy value of the demodulated signals calculated by the energy calculation module 37, and provide the amplification parameter control signal to the analog amplifier 31, to adjust the amplification parameter of the analog amplifier 31, so that the analog amplifier 31 performs an amplifying processing on the received signal.

The micro-controller of this embodiment may directly connect with the digital demodulator (as shown in FIG. 8A) and provide the demodulation control signal to the digital demodulator; and may also connect with the digital demodulator via the demodulation control register (as shown in FIG. 8B) and provide the demodulation control signal to the digital demodulator via the demodulation control register. In addition, in this embodiment, the demodulated signal output by the digital demodulator may also be output to the demodulation control register, and the central processor reads demodulated data from the demodulation control register.

Specifically, the micro-controller structure as shown in FIG. 8B is taken as an example. The working principle of the micro-controller is as follows:

The central processor 61 reads the demodulated signal stored in the demodulation control register 39 via the data bus, and decides whether the demodulated signal is valid, for example, it decides whether a received signal form matches a default signal form. The default signal form means that the central processor preknows the modulation mode of the power line carrier signal, and prestores the corresponding demodulated signal form, so as to decide whether the received demodulated signal is valid when demodulation is performed; or decide whether the acquired data format conforms to the data format of the demodulation protocol which is set by the central processor at present; if yes, it is indicated that the signal is valid and the demodulation mode used by the receiving circuit is correct; otherwise, it is indicated that the signal is invalid and the demodulation mode used by the receiving circuit is wrong; if the central processor 61 decides that the read signal is valid, it continues to read the demodulated signal stored in the demodulation control register 39, and the operation is the same as the prior technology; and if the central processor 61 decides that the signal is invalid, it is indicated that the demodulation mode of the digital demodulator 36 does not conform to the modulation mode of the received signal, then the central processor 61 generates the demodulation control signal and transmits it to the demodulation control register 39; and the demodulation control register 39 provides the demodulation control signal to the digital demodulator 36, to control the digital demodulator 36 to replace the current demodulation mode. For example, if the current demodulation mode of the digital demodulator 36 is the FSK demodulation mode, this demodulation mode is replaced as the PSK demodulation mode; otherwise, the PSK demodulation mode is replaced as the FSK demodulation mode.

The digital demodulator performs demodulation on the received power line carrier signal according to the modified demodulation mode, and outputs the demodulated signal to the demodulation control register 39, so that the central processor 61 continues to read the demodulated signal.

By using the micro-controller of this embodiment, the receiving circuit supports different demodulation modes, and the central processor decides whether the demodulated signal is valid. If it is decided that the demodulated signal is invalid, the demodulation control signal is generated to control the receiving circuit to perform FSK demodulation or PSK demodulation on the power line carrier signal, thereby performing a demodulation processing on the power line carrier signal in the different modulation modes, and overcoming the defect of supporting to perform demodulation on the power line carrier signal in only one modulation mode in the conventional power line carrier systems.

Further, the micro-controller of this embodiment also includes a test interface 62. The test interface 62 connects with the central processor 61 and the receiving circuit 60, and is configured to test each of functional modules in the receiving circuit 60 under control of the central processor 61, e.g., to test the performance, working condition of the functional modules, and connection characteristic among the functional modules.

Based on the implementation of the above embodiments, the micro-controller of this embodiment also applies to process the power line carrier signal in different modulation or demodulation modes. In addition, the central processor obtains data via a variety of buses directly, and processes the data. With regard to the application system, it has the advantages of simple implementation and low cost.

Embodiment 7

Figure 9A:
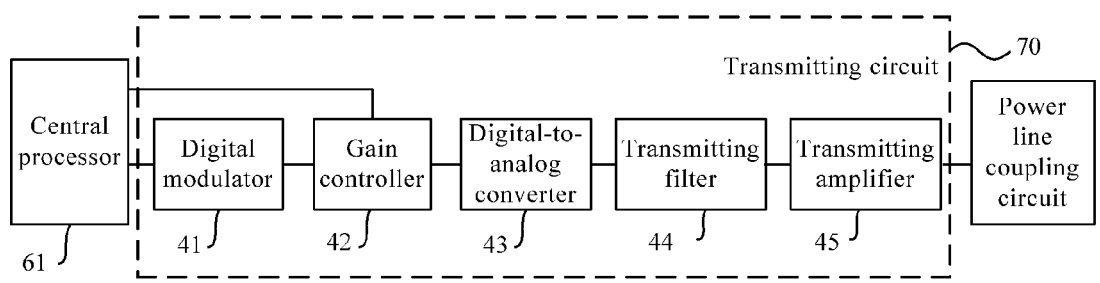
FIG. 9A is a schematic structural diagram of a micro-controller according to Embodiment 7 of the present invention.
Figure 9B:
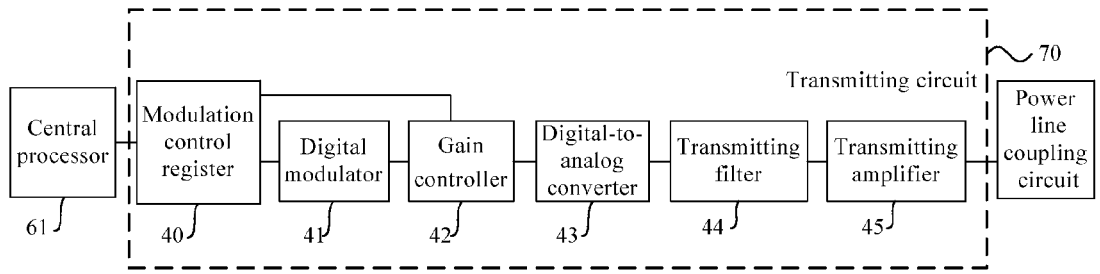
FIG. 9B is another schematic structural diagram of the micro-controller according to Embodiment 7 of the present invention.

FIG. 9A is a schematic structural diagram of a micro-controller according to Embodiment 7 of the present invention, and FIG. 9B is another schematic structural diagram of the micro-controller according to Embodiment 7 of the present invention. As shown in FIG. 9A, a power line carrier system of this embodiment includes: a central processor 61 and a transmitting circuit 70, where the central processor 61 connects with the transmitting circuit 70.

The transmitting circuit 70 includes: a digital modulator 41, a gain controller 42, a digital-to-analog converter 43, a transmitting filter 44, and a transmitting amplifier 45 connected successively.

The central processor 61 connects with the digital modulator 41, and is configured to provide a modulation control signal and a digital signal to be modulated to the digital modulator 41.

The digital modulator 41 is configured to receive the digital signal provided by the central processor 61, and select to perform FSK modulation or PSK modulation on the digital signal according to the modulation control signal. The digital modulator 41 supports two modulation modes, and the central processor 61 may control the digital modulator 41 to select the corresponding modulation mode according to the actual demand.

The gain controller 42 is configured to amplitude-adjust the modulated signals output by the digital modulator 41, and output the amplitude-adjusted signals to the digital-to-analog converter 43; and the digital-to-analog converter 43 is configured to convert the signals output by the gain controller 42 into an analog signal, to adapt to the processing requirement of a back-stage circuit.

The transmitting filter 44 is configured to filter the received analog signal; and the transmitting amplifier 45 is configured to amplify the filtered analog signal output by the transmitting filter 44, to form a power line carrier signal and output the power line carrier signal. For example, the transmitting amplifier 45 may connect with a power line coupling circuit, and send out the power line carrier signal via the power line coupling circuit.

Further, the transmitting circuit 70 of this embodiment also includes a modulation control register 40, as shown in FIG. 9B. The modulation control register 40 connects with the central processor 61, and the central processor 61 performs a read-write operation on the modulation control register 40 via a variety of buses (a data bus, an address bus, and a control bus). The modulation control register 40 connects with the digital modulator 41, and provides the modulation control signal to the digital modulator 41, so that the digital modulator 41 selects the FSK or PSK modulation mode to perform FSK modulation or PSK modulation on the digital signal to be modulated.

In this embodiment, the central processor 61 may directly connect with the digital modulator 41 (as shown in FIG. 9A), and provide the modulation control signal and the digital signal to be modulated to the digital modulator 41; may also connect with the digital modulator 41 via the modulation control register 40 (as shown in FIG. 9B); and the central processor 61 provides the modulation control signal to the digital modulator 41 via the modulation control register 40. In addition, the digital signal to be modulated in this embodiment may also be provided to the digital modulator 41 by the modulation control register 40, and the digital modulator 41 performs FSK modulation or PSK modulation on the signal to be modulated according to the modulation control signal.

Specifically, the micro-controller shown in FIG. 9B is taken as an example. The working principle of the micro-controller is illustrated as follows:

The central processor 61 gathers a signal of the peripheral device to form the signal to be modulated, and generates the modulation control signal according to the actual situation; the central processor 61 transmits the signal to be modulated and the modulation control signal to the modulation control register 40 via the buses (including the data bus, the address bus, and the control bus); and the modulation control register 40 receives the signal to be modulated and the modulation control signal, and transmits the modulation control signal to the digital modulator 41, so that the digital modulator 41 selects the modulation mode according to the modulation control signal to finish performing modulation on the signal to be modulated.

The transmitting circuit 70 in this embodiment has the FSK modulation mode or PSK modulation mode. The corresponding modulation mode may be selected according to the modulation control signal to finish performing modulation on the signal; and it can be achieved to perform modulation on the signal in a different mode, thereby overcoming the defect of supporting to perform modulation on the signal in only one modulation mode in conventional power line carrier communication systems.

Embodiment 8

Figure 10:
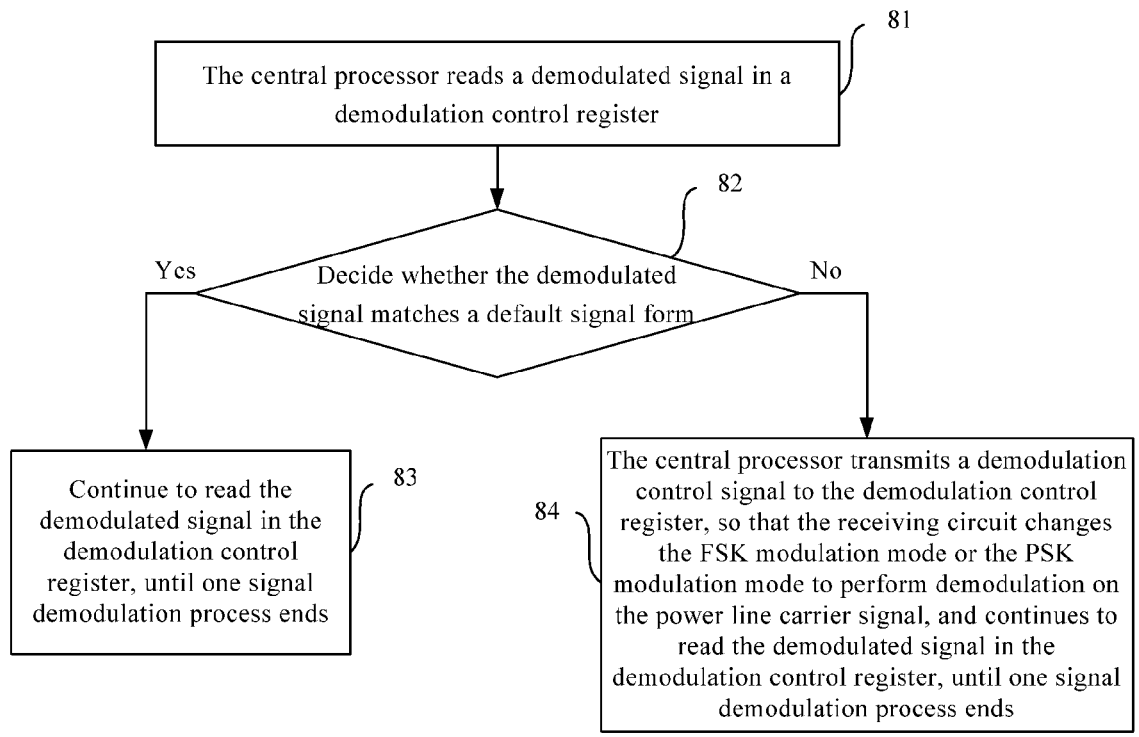
FIG. 10 is a flowchart of a method for power line carrier communication according to Embodiment 8 of the present invention.

FIG. 10 is a flowchart of a method for power line carrier communication according to Embodiment 8 of the present invention. The method of this embodiment may be implemented based on the micro-controller according to Embodiment 6. The technical solutions of the present invention are described in terms of a central processor in this embodiment. As shown in FIG. 10, the method of this embodiment includes the following steps:

Step 81: The central processor reads a demodulated signal in a demodulation control register.

The central processor may read the demodulated signal stored in the demodulation control register via buses including a data bus, an address bus, and a control bus. The demodulated signal is transmitted to the demodulation control register after a receiving circuit performs demodulation on a power line carrier signal, so that the central processor reads the demodulated signal.

Step 82: The central processor decides whether the read demodulated signal matches a default signal form; if yes, performing step 83; otherwise, performing step 84. Specifically, the default signal form is configured to provide a criterion to the central processor. The criterion is configured to decide whether the demodulation mode in which the receiving circuit performs demodulation on the power line carrier signal conforms to the modulation mode of the power line carrier signal. The default signal form may be the modulation mode of the power line carrier signal preknown and stored by the central processor; and may also be the signal form that is obtained and stored by interacting with each other before communication, that is, the default signal form is the same as the original signal form of the modulated power line carrier signal.

Step 83: The central processor continues to read the demodulated signal in the demodulation control register, until one signal demodulation process ends.

Step 84: The central processor transmits a demodulation control signal to the demodulation control register, so that the receiving circuit changes the FSK modulation mode or the PSK modulation mode to perform demodulation on the power line carrier signal, and the central processor continues to read the demodulated signal in the demodulation control register, until one signal demodulation process ends.

The step 84 is configured to control the receiving circuit to perform correct demodulation on the received power line carrier signal.

The method for power line carrier communication of this embodiment is implemented based on the above micro-controller. The detailed process has been disclosed in the description of Embodiment 6 and is not repeatedly described here. The central processor of this embodiment adjusts the demodulation mode of the receiving circuit through the demodulation control register; it can be achieved to perform demodulation on the power line carrier signal in different modulation modes; and the method has the advantage of easy implementation.

Embodiment 9

Figure 11:
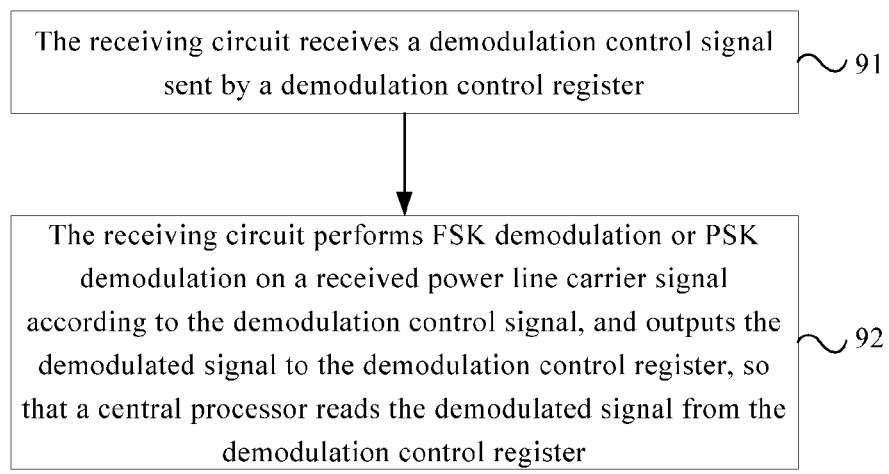
FIG. 11 is a flowchart of a method for power line carrier communication according to Embodiment 9 of the present invention.

FIG. 11 is a flowchart of a method for power line carrier communication according to Embodiment 9 of the present invention. This embodiment may be implemented based on the micro-controller according to Embodiment 6. The technical solutions of the present invention are described in terms of the receiving circuit in this embodiment. As shown in FIG. 11, the method of this embodiment includes the following steps:

Step 91: the receiving circuit receives a demodulation control signal sent by a demodulation control register.

Specifically, a modulation mode (e.g., an FSK modulation mode or a PSK modulation mode) used by the transmitting circuit may be set, and carrier frequency, amplification factor, etc. may also be set.

Step 92: the receiving circuit performs FSK demodulation or PSK demodulation on a received power line carrier signal according to the demodulation control signal, and outputs the demodulated signal to the demodulation control register, so that the central processor reads the demodulated signal from the demodulation control register.

The demodulation control signal is generated through the following steps: the central processor firstly compares a signal form of the read demodulated signal with a default signal form, and decides whether the demodulated signal matches the default signal form; and if the central processor decides the demodulated signal does not match the default signal form, the demodulation control signal is generated, where the demodulation control signal is configured to control the receiving circuit to change the current demodulation mode.

The method for power line carrier communication of this embodiment is implemented based on the micro-controller according to Embodiment 6. The detailed process has been disclosed in the description of Embodiment 6 and is not repeatedly described here. The central processor of this embodiment transmits the demodulation control signal via the demodulation control register so that the demodulation mode of the receiving circuit can be changed; it can be achieved to perform demodulation on the power line carrier signal in different modulation modes; and the method has the advantage of easy implementation.

Those skilled in the art should understand that all or part of the steps of the method according to the above embodiments may be implemented by a program instructing relevant hardware. The program may be stored in a computer readable storage medium. When the program runs, the program executes steps of the method specified in the above embodiments. The above-mentioned storage medium may be any medium capable of storing program codes, such as a ROM, a RAM, a magnetic disk, or a CD-ROM.

Finally, it should be noted that the above embodiments are merely provided for describing the technical solutions of the present invention, but not intended to limit the present invention. Although the present invention has been described in detail with reference to the foregoing embodiments, it should be understood that those skilled in the art can make modifications to the technical solutions recited in the foregoing embodiments or equivalent substitutions of a part of technical features thereof, and these modifications or substitutions do not make the essence of their corresponding technical solutions deviate from the spirit and scope of the technical solutions of the embodiments of the present invention.

What is claimed is:

1. A micro-controller, comprising a central processor, and further comprising a receiving circuit, wherein the receiving circuit comprises:
    an analog amplifier, configured to connect with a power line coupling circuit, receive a power line carrier signal, and amplify the power line carrier signal;
    a receiving filter which connects with the analog amplifier, configured to filter the power line carrier signal output by the analog amplifier;
    an analog-to-digital converter which connects with the receiving filter, configured to convert the filtered power line carrier signal output by the receiving filter into digital signals;
    a digital mixer which connects with the analog-to-digital converter, configured to mix the digital signals;
    a digital filter which connects with the digital mixer, configured to filter the mixed digital signals output by the digital mixer;
    a digital demodulator which connects with the digital filter, configured to perform FSK demodulation or PSK demodulation on the digital signals filtered by the digital filter, and output the demodulated signal; and
    the central processor connects with the digital demodulator of the receiving circuit, and is configured to provide a demodulation control signal to the digital demodulator, so that the digital demodulator selects an FSK demodulation mode or a PSK demodulation mode.

2. The micro-controller according to claim 1, wherein the receiving circuit further comprises: a primary amplifier, a bandpass filter, and a secondary amplifier;
    the primary amplifier connects with the receiving filter, and is configured to amplify the power line carrier signal output by the receiving filter;
    the bandpass filter connects with the primary amplifier, and is configured to filter the power line carrier signal amplified by the primary amplifier; and
    the secondary amplifier connects with the bandpass filter and the analog-to-digital converter, and is configured to amplify the power line carrier signal filtered by the bandpass filter and transmit the amplified power line carrier signal to the analog-to-digital converter.

3. The micro-controller according to claim 1, wherein the receiving circuit further comprises: a demodulation control register;
    the demodulation control register connects with the central processor; the demodulation control register connects with the digital demodulator, the digital filter, and the digital mixer, and is configured to provide the demodulation control signal to the digital demodulator and provide a filtering parameter and a mixing parameter corresponding to the demodulation control signal to the digital filter and the digital mixer.

4. The micro-controller according to claim 1, wherein the receiving circuit further comprises:
    an energy calculation module which connects with the digital demodulator, configured to calculate an energy value of the signal demodulated by the digital demodulator; and
    an automatic gain control module which connects with the energy calculation module and the analog amplifier, configured to generate an amplification parameter control signal according to the energy value of the signal calculated by the energy calculation module, and provide the amplification parameter control signal to the analog amplifier, to adjust an amplification parameter of the analog amplifier.

5. The micro-controller according to claim 2, wherein the receiving circuit further comprises:
    an energy calculation module which connects with the digital demodulator, configured to calculate an energy value of the signal demodulated by the digital demodulator; and
    an automatic gain control module which connects with the energy calculation module and the analog amplifier, configured to generate an amplification parameter control signal according to the energy value of the signal calculated by the energy calculation module, and provide the amplification parameter control signal to the analog amplifier, to adjust an amplification parameter of the analog amplifier.

6. The micro-controller according to claim 3, wherein the receiving circuit further comprises:
    an energy calculation module which connects with the digital demodulator, configured to calculate an energy value of the signal demodulated by the digital demodulator; and
    an automatic gain control module which connects with the energy calculation module and the analog amplifier, configured to generate an amplification parameter control signal according to the energy value of the signal calculated by the energy calculation module, and provide the amplification parameter control signal to the analog amplifier, to adjust an amplification parameter of the analog amplifier.

7. The micro-controller according to claim 1, further comprising a transmitting circuit;
   the transmitting circuit comprises: a digital modulator, a gain controller, a digital-to-analog converter, a transmitting filter, and a transmitting amplifier connected successively;
   the digital modulator is configured to perform FSK modulation or PSK modulation on received digital signals; the gain controller is configured to amplitude-adjust the modulated signals output by the digital modulator; the digital-to-analog converter is configured to convert the amplitude-adjusted digital signals output by the gain controller into an analog signal; the transmitting filter is configured to filter the analog signal output by the digital-to-analog converter; and the transmitting amplifier is configured to amplify the filtered analog signal output by the transmitting filter to form a power line carrier signal and output the power line carrier signal; and
   the central processor connects with the digital modulator of the transmitting circuit, and is configured to provide a modulation control signal to the digital modulator, so that the digital modulator selects an FSK modulation mode or a PSK modulation mode.

8. The micro-controller according to claim 7, wherein the transmitting circuit further comprises: a modulation control register;
   the modulation control register connects with the central processor; the modulation control register connects with the digital modulator and the gain controller, and is configured to provide the modulation control signal to the digital modulator, to control the digital modulator to perform FSK modulation or perform PSK modulation and provide an amplification parameter corresponding to the modulation control signal to the gain controller.

9. A method for power line carrier communication, which is implemented based on the micro-controller according to claim 1, comprising:
   reading, by the central processor, a demodulated signal in a demodulation control register; and
   transmitting a demodulation control signal to the demodulation control register when it is decided, by the central processor, that the demodulated signal does not match a default signal form, to change an FSK demodulation mode or a PSK demodulation mode for a receiving circuit and perform demodulation on a power line carrier signal.

10. A method for power line carrier communication, which is implemented based on the micro-controller according to claim 1, comprising:
    receiving, by the receiving circuit, a demodulation control signal sent by a demodulation control register; and
    changing a current demodulation mode according to the demodulation control signal, to perform FSK demodulation or PSK demodulation on a received power line carrier signal, wherein the demodulation control signal is generated when it is decided, by the central processor, that a demodulated signal form does not match a default signal form.

* * * * *